(12) United States Patent
Krone et al.

(10) Patent No.: US 6,668,532 B2
(45) Date of Patent: Dec. 30, 2003

(54) HARVESTING MACHINE FOR STALK CROPS HAVING A STEPPED CUTTING BLADES

(75) Inventors: Bernard Krone, Spelle (DE); Josef Horstmann, Ibbenbüren (DE); Bernward Overmeyer, Mettingen (DE); Alfons Keller, Mettingen (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 10/105,142

(22) Filed: Mar. 25, 2002

(65) Prior Publication Data

US 2002/0144494 A1 Oct. 10, 2002

(30) Foreign Application Priority Data

Apr. 4, 2001 (DE) .......................... 101 16 675

(51) Int. Cl.[7] .............................. A01D 45/02
(52) U.S. Cl. .............................. 56/93; 56/98
(58) Field of Search .............................. 56/93, 94, 98, 56/14.3, 56, 60, 119

(56) References Cited

U.S. PATENT DOCUMENTS

| | | | | |
|---|---|---|---|---|
| 4,211,059 A | * | 7/1980 | Decoene | ........................ 56/94 |
| 4,607,703 A | * | 8/1986 | Wang | ............................ 171/1 |
| 4,622,804 A | * | 11/1986 | Krone et al. | .................. 56/13.9 |
| 4,771,592 A | * | 9/1988 | Krone et al. | .................. 56/14.3 |
| 5,040,362 A | * | 8/1991 | Morgan et al. | ................. 56/93 |
| 5,881,543 A | * | 3/1999 | Austin, Jr. | ..................... 56/119 |

FOREIGN PATENT DOCUMENTS

| DE | 33 24 899 | | 1/1985 | |
|---|---|---|---|---|
| DE | 19947288 C1 | * | 11/2000 | .......... A01D/45/02 |
| DE | 19951636 A1 | * | 5/2001 | .......... A01D/45/02 |

* cited by examiner

Primary Examiner—Árpád Fábián Kovács
(74) Attorney, Agent, or Firm—Gudrun E. Huckett

(57) ABSTRACT

A harvesting machine for harvesting corn and similar crops on stalks has at least one circulating endless conveyor for engaging a crop, wherein the endless conveyor forms a crop feed area for feeding the crop to an inlet opening of a processing device for further processing the crop. The endless conveyor has a lower cutting plane for the crop with outwardly extending conveying and guiding elements and at least one cutting blade arranged below the conveying and guiding elements. The cutting blade has a stepped configuration and, viewed in a running direction of the conveying and guiding elements, has cutting segments. Each cutting segment has a cutting edge and extends at a slant outwardly relative to a circulating path of the conveying and guiding elements. The cutting blade has cutting segment steps positioned between two neighboring ones of the cutting segments, respectively.

14 Claims, 4 Drawing Sheets

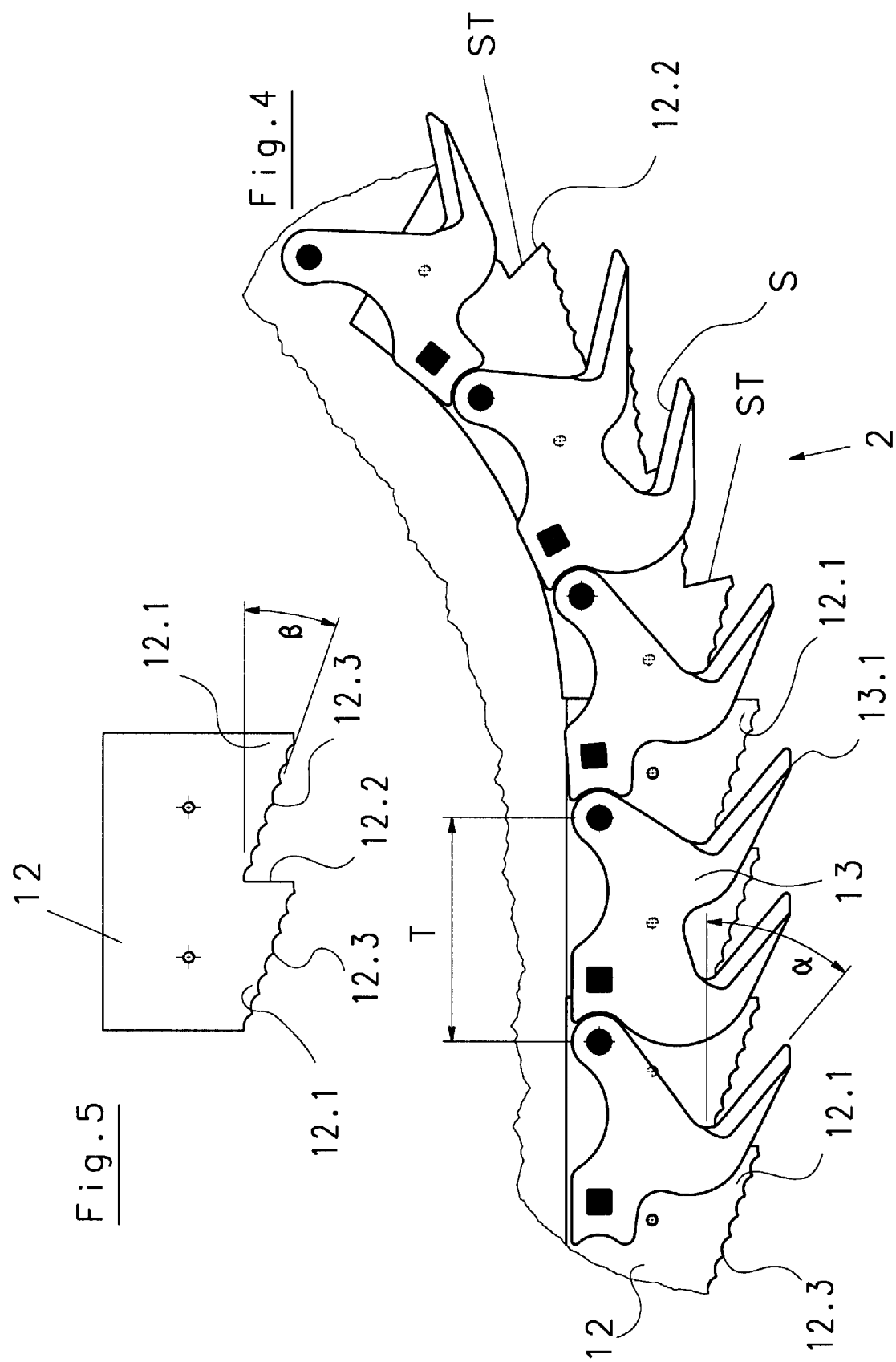

HARVESTING MACHINE FOR STALK CROPS HAVING A STEPPED CUTTING BLADES

BACKGROUND OF THE INVENTION

1. Field of the Invention

The invention relates to a harvesting machine for harvesting corn and similar crops on stalks, wherein the harvesting machine has at least one circulating endless conveyor for engaging the crop which conveyor forms a crop feed area directing the crop toward an inlet opening of a processing device for further processing the crop, in particular, a chopper, wherein the endless conveyor has a lower cutting plane for the crop which is comprised of outwardly extending conveying and guiding elements as well as at least one cutting blade arranged below the conveying and guiding elements.

2. Description of the Related Art

From DE 33 24 899 C2 a harvesting machine is known in which, for separating the stalks of the crop, tools are provided which are nested in a link chain. The link chain is moreover provided with nested holding means for conveying the separated stalks. The stalks are fed to the inlet opening of a chopper or the like. For this purpose, between oppositely driven endless chains a feed area is provided in which also a deflection of the chains is carried out. In the area of this deflection the received stalks are fed also into the processing device so that a significant crop waste will result in this area. Accordingly, there is the risk that the crop is not completely guided through the chopper or the like but instead builds up in front of the inlet opening. Moreover, during the entire circulation of the conveyor crop material, in particular, the leaves or similar long-fiber components, will stick to the drivers of the chain so that there is the risk that the transport function of the drivers over the course of employment of the harvesting machine will decline.

Moreover, a harvesting machine of the aforementioned kind is known in which in the cutting plane conveying and guiding elements, for example, in the form of hook-shaped blades, of the endless conveyor are provided which interact with a cutting blade. This cutting blade can be mounted fixedly on the frame part of the harvesting machine. As an alternative, it is also possible to employ instead of the stationary blade rotating cutting disks or oscillatingly driven blades which interact either by a free cut or in interaction with the blades of the conveying and guiding elements of the endless conveyor. The cutting blade is provided with a continuous cutting edge so that each holding or cutting element has a corresponding blade area correlated therewith. During operation, such a configuration of the cutting action of the crop, e.g., a stalk of corn, can result in the cut being carried out always at the same location of the blade areas of the cutting blade so that at these locations increased wear results. Also, in these areas increased soiling occurs.

SUMMARY OF THE INVENTION

It is an object of the present invention to further develop a harvesting machine of the aforementioned kind such that increased wear on the cutting blades is counteracted. Moreover, the harvesting machine should have improved cleaning properties.

In accordance with the present invention, this is achieved in that the cutting blade has a stepped configuration with steps and, viewed in the running direction of the conveying and guiding elements, has cutting segments having cutting edges and extending at a slant outwardly relative to a circulating path of the conveying and guiding elements, wherein between two neighboring cutting segments a cutting segment step is formed.

The important advantage of the harvesting machine according to the present invention is that the service life of the cutting blade is significantly increased because of the step-shaped configuration of the cutting blade with steps. This also holds true for the conveying and guiding elements of the endless conveyor interacting with the cutting blade. As a result of the step-shaped cutting segments, i.e., a sequence of individual cutting segments with cutting edge areas extending at a slant outwardly relative in the running direction of the conveyor, the crop can be cut across the entire length of the respective cutting edge or across the length of the edge of the conveying and guiding element of the endless conveyor interacting with this cutting edge. In contrast to conventional harvesting machines with a continuous cutting edge of the cutting blade, the cutting action of, for example, the stalk, is not always carried out at the same location so that great wear at this location can be prevented. Moreover, the harvesting machine according to the invention has significantly improved cleaning properties in the area of the cutting plane which is, in particular, the result of the lower ends of the crop remains which are jammed between the conveying and guiding elements and the cutting blade being released upon passing the cutting segment step of the cutting blade segment and either are cut off or will drop.

It was found that the cutting output and also the desired improved cleaning action can be optimized, in particular, when the angle $\beta$ of the cutting blade of a cutting segments relative to a baseline or reference line, which intersects the longitudinal axis of the travel direction of the harvesting machine at a right angle and/or is oriented tangentially to the circulating path of the endless conveyor, is smaller than the angle a of the slantedly extending area of the conveying and guiding elements. The angle $\beta$ is preferably approximately $½\alpha$.

In conventional harvesting machines, the division T, i.e., the spacing of the coupling points of two neighboring conveying and guiding elements of the endless conveyor, is such that an end of the conveying and guiding elements formed as a counter blade is provided for each division T. This corresponds to a matching division. Preferably, a harvesting machine according to the invention is configured such that the number of counter blades is selected such that over the length of two divisions T of the conveying and guiding elements of the endless conveyor at least three ends of the conveying and guiding elements formed as counter blades are provided; this means that for two divisions T of the conveying and guiding elements at least three areas for receiving stalk-like crop material are provided. In this way, a reliable cutting action of the crop at higher driving speeds is also possible.

The step-shaped configuration of the cutting segments of the cutting blade is such that the cutting segment has a forward slant in the travel direction of the conveying and guiding elements across the entire width of the cutting segment and then has a sudden or abrupt drop, i.e., parallel to the longitudinal axis of the travel direction, to the initial dimension of the cutting blade of the preceding cutting segment. In this way, the desired release of the crop is possible once it has passed a cutting segment. The cutting edge can be provided with or without cylindrical grinding.

Each cutting segment can be an individual blade mounted, for example, on the harvesting machine frame. However, it is also possible to provide one blade with two cutting segments or more.

BRIEF DESCRIPTION OF THE DRAWING

In the drawing:

FIG. 4 shows a plan view onto a detail of the attachment, wherein only the lowermost plane of the endless conveyor adjacent to the cutting blades is illustrated;

FIG. 5 shows a plan view onto a blade comprising two cutting segments.

DESCRIPTION OF THE PREFERRED EMBODIMENTS

The harvesting machine, which is not illustrated in detail, is a self-propelling vehicle and comprises an attachment 1 which, by means of two endless conveyors 2 and 3 formed of link chains, cuts the crop, picks it up and feeds it to an inlet opening 4, arranged in the central area between the endless conveyors 2 and 3, of a processing device, for example, a chopper, arranged downstream of the endless conveyors 2, 3. Such processing devices are well known in the art and therefore not illustrated in this context.

Figure 2:
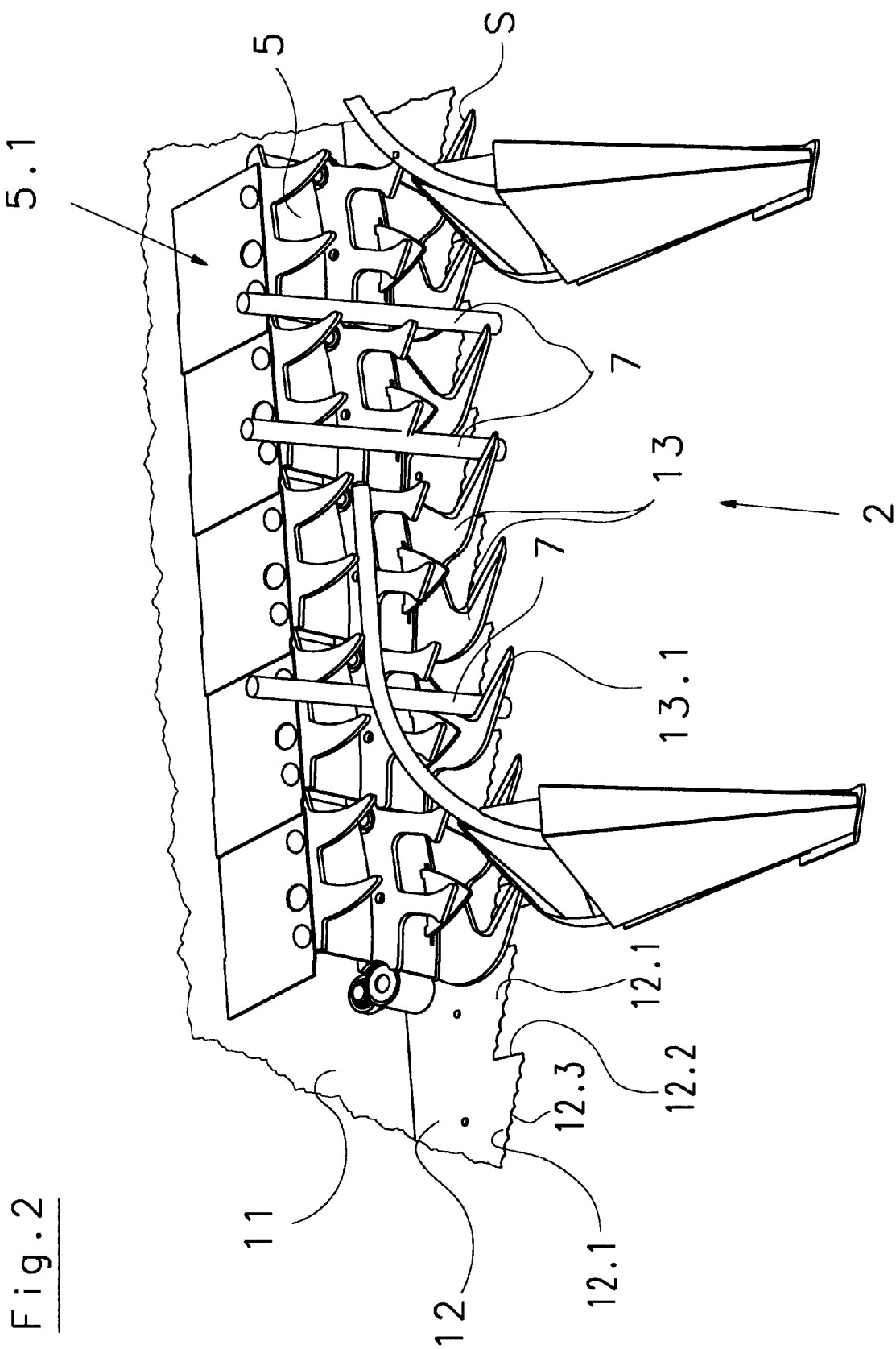
FIG. 2 shows a perspective front view of a detail of the attachment.
Figure 3:
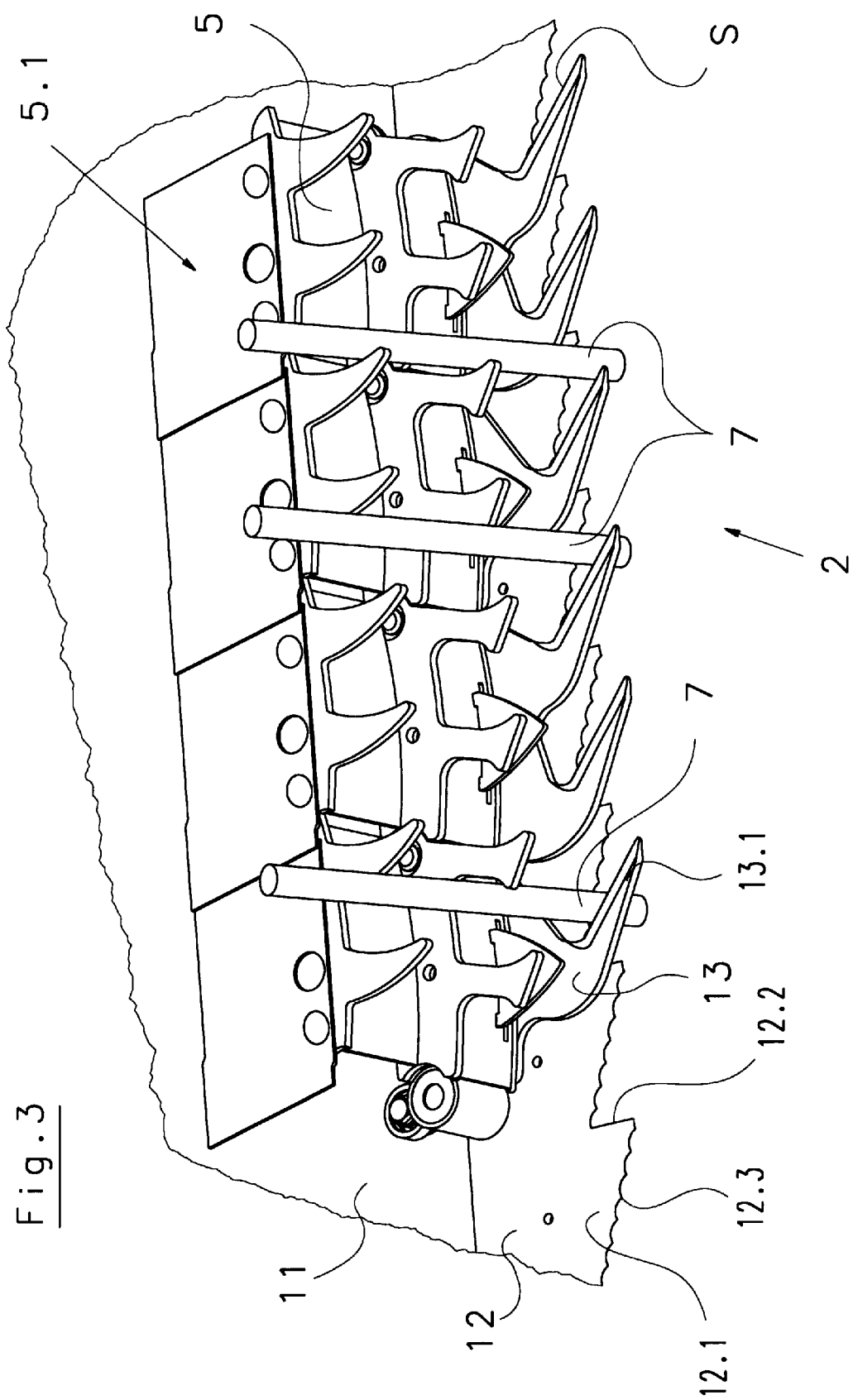
FIG. 3 shows a another perspective front view of a detail of the attachment.

The endless conveyors 2, 3 formed as link chains are driven in opposite directions and circulate in the direction toward the center of the attachment 1 in order to feed the cut crop to the inlet opening 4. As a result of the working run 5.1 being arranged transversely to the travel direction F, a crop strip with a plurality of adjacently planted rows can be cut. The harvesting machine can also be used independent of the crop rows. In the illustrated embodiment of the harvesting machine with two endless conveyors, a divider point 6 is provided in the central area which divides the feed area and effects guiding of the central crop rows to the lateral link chains 5. The link chains 5 fulfill, on the one hand, the function of separating the stalks (see FIGS. 2 and 3) from the roots and, on the other hand, the function of conveying them to the inlet opening 4 of the processing device. The endless conveyors 2, 3 or the link chains 5 are secured in frames 8 and 9 and are pivotable as a whole about pivot axes extending approximately parallel to the travel direction F by means of support frames so that they can be pivoted from a horizontal operating position into a substantially vertical transport position when the harvesting machine travels on roads.

Figure 1:
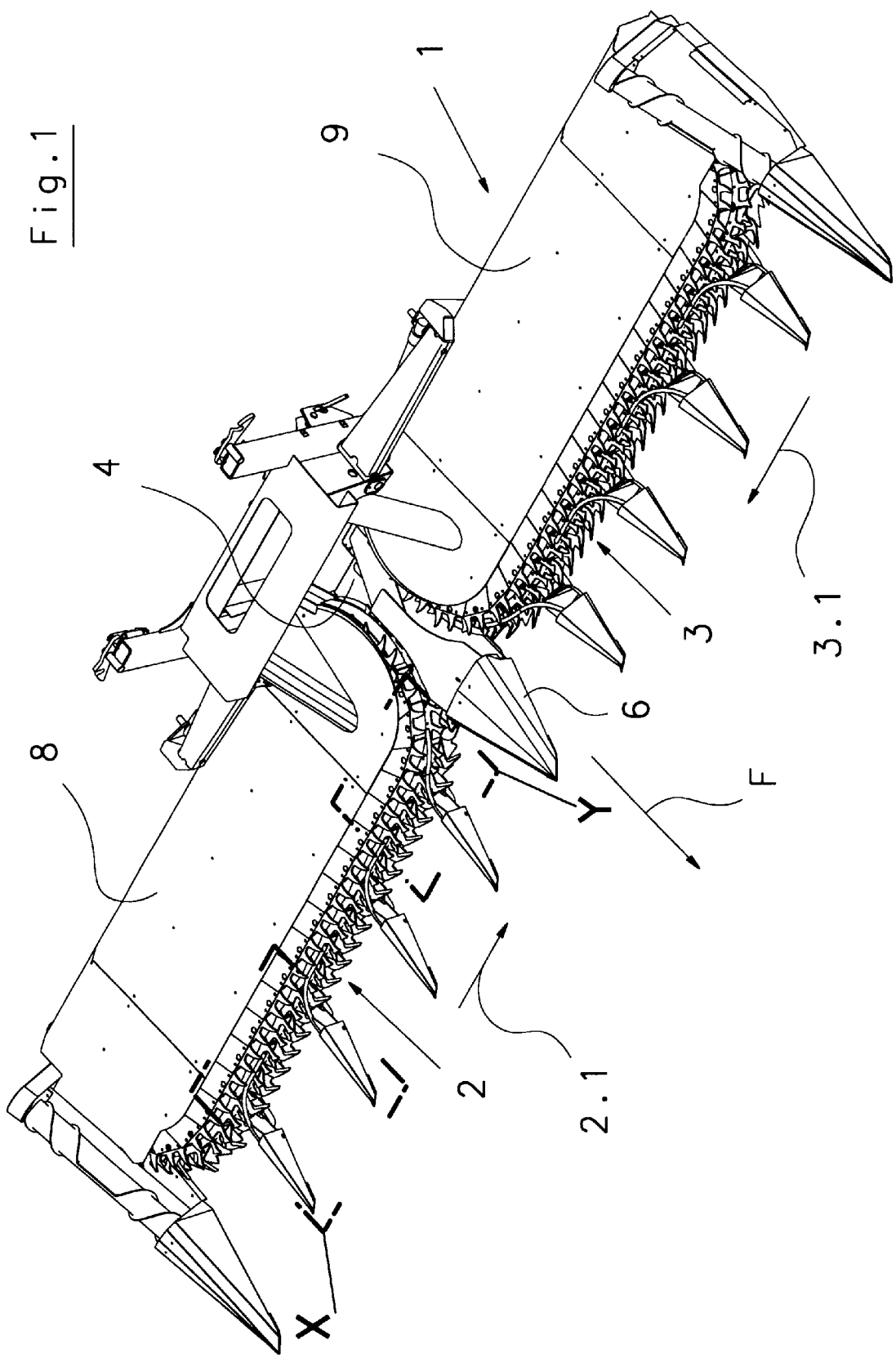
FIG. 1 is a perspective view of an embodiment of a harvesting machine according to the invention with two endless conveyors arranged in an attachment and circulating in opposite directions.

The link chains 5 have link members or chain members which are formed as uniform functional units. Cutting blades 12 are provided in their lower area and are fixedly connected to the harvesting machine frame 11. These cutting blades 12 are provided below conveying and guiding elements 13 with which the cutting blades 12 form a cutting plane S. The conveying and guiding elements 13 can also be formed as cutting means and have slantedly forwardly oriented ends 13.1 acting like a counter blade. These ends 13.1 have an angle a relative to a perpendicular line (FIG. 4), in particular, to a perpendicular line relative to the longitudinal axis of the travel direction (FIG. 1), so that the perpendicular line as a reference line intersects the travel direction axis F at an angle of 90°. The conveying and guiding elements 13 have a division T (FIG. 4) which is determined by the two forward fastening elements of two neighboring guiding and conveying elements 13. The cutting blade 12 as a whole is of a step-shaped configuration and has cutting segments 12.1 with an offset or step 12.2 positioned between two neighboring cutting segments 12.1. Each cutting segment 12.1 has a cutting edge 12.3 which is positioned relative to the running direction of the conveying and guiding elements 13 at a slant forwardly. In the illustrated embodiment, the cutting edge 12.3 is provided with a cylindrical grinding. Because of the step 12.2 or the offset 12.2, a cutting segment step ST is formed which extends from the tip of the slantedly extending cutting edge 12.3 to the base of the next or sequentially arranged cutting edge 12.3. The cutting segment steps ST have preferably a height of 10% to 50% of the width of the cutting segments.

The cutting edge 12.3 extends thus across the width of the cutting segment 12.1 wherein the cutting width of two neighboring cutting segments 12.1 is greater than the division T of the conveying and guiding elements 13 (FIG. 4). The segment width matches substantially an integral divisor of a standard spacing of rows of a standardized crop planting.

Individual blades can be used for the cutting blade 12, wherein the individual cutting blades are formed as a cutting segment, respectively. However, it is also possible, as illustrated, for example, in FIG. 5, that an individual cutting blade 12 has two or more cutting segments 12.1. The slantedly forwardly extending cutting segments or their cutting edges 12.3 are positioned at an angle β relative to the reference line perpendicular to the travel direction axis F. This angle β is smaller than the angle a of the conveying and guiding elements; preferably, this angle β is approximately half the size of the angle a of the conveying and guiding elements 13.

In order to realize a secure cutting of the crop, in particular, at high travel speeds, it is provided that for two divisions T of the cutting and guiding elements 13 at least three ends 13.1 are provided.

Overall, this provides a harvesting machine which has an excellent service life and an improved cleaning effect. As a result of the step-shaped configuration of the cutting plane (sequential arrangement of cutting edges with intermediate cutting segment steps ST, respectively), the crop can be cut over the entire length of the cutting edges 12.3 or over the length of the areas of the conveying and guiding elements 13 interacting with the cutting edges 12.3. This results in a longer service life of the cutting blade 12 as well as of the conveying and guiding elements 13.

While specific embodiments of the invention have been shown and described in detail to illustrate the inventive principles, it will be understood that the invention may be embodied otherwise without departing from such principles.

What is claimed is:

1. A harvesting machine for harvesting corn and similar crops on stalks, the harvesting machine comprising:

at least one circulating endless conveyor for engaging a crop, wherein the at least one endless conveyor forms a crop feed area for feeding the crop to an inlet opening of a processing device for further processing the crop;

wherein the at least one endless conveyor has a lower cutting plane for the crop, wherein the lower cutting plane comprises outwardly extending conveying and guiding elements and at least one cutting blade arranged below the conveying and guiding elements;

wherein the cutting blade has a stepped configuration and, viewed in a running direction of the conveying and guiding elements, has cutting segments, wherein each one of the cutting segments has a cutting edge and extends at a slant outwardly relative to a circulating path of the conveying and guiding elements;

wherein the cutting blade has cutting segment steps positioned between two neighboring ones of the cutting segments, respectively.

2. The harvesting machine according to claim 1, wherein the cutting segments have a segment width and wherein the cutting edge of each one of the cutting segments extends substantially across the entire segment width.

3. The harvesting machine according to claim 2, wherein the segment width matches substantially an integral divisor of a standard spacing of rows of a standardized crop planting.

4. The harvesting machine according to claim 1, wherein the cutting segments, in the running direction of the conveying and guiding elements, are positioned at an angle ($\beta$) relative to a reference line which reference line intersects a travel direction of the harvesting machine at a right angle or is oriented tangentially to a circulating path of the at least one endless conveyor.

5. The harvesting machine according to claim 1, wherein the cutting segments, in the running direction of the conveying and guiding elements, are positioned at an angle ($\beta$) relative to a reference line which reference line intersects a travel direction of the harvesting machine at a right angle and is oriented tangentially to a circulating path of the at least one endless conveyor.

6. The harvesting machine according to claim 1, wherein the conveying and guiding elements have ends positioned at an angle ($\alpha$) relative to a reference line which intersects a travel direction of the harvesting machine at a right angle or is oriented tangentially to a circulating path of the at least one endless conveyor.

7. The harvesting machine according to claim 1, wherein the conveying and guiding elements have ends positioned at an angle ($\alpha$) relative to a reference line which intersects a travel direction of the harvesting machine at a right angle and is oriented tangentially to a circulating path of the at least one endless conveyor.

8. The harvesting machine according to claim 1, wherein the cutting segments, in the running direction of the conveying and guiding elements, are positioned at a first angle ($\beta$) relative to a reference line, which reference line intersects a travel direction of the harvesting machine at a right angle or is oriented tangentially to a circulating path of the at least one endless conveyor, and wherein the conveying and guiding elements have ends positioned at a second angle ($\alpha$) relative to the reference line, wherein the first angle ($\beta$) is smaller than the second angle ($\alpha$).

9. The harvesting machine according to claim 8, wherein the first angle ($\beta$) is approximately half the size of the second angle ($\alpha$).

10. The harvesting machine according to claim 1, wherein the cutting edges have a cylindrical grinding.

11. The harvesting machine according to claim 1, wherein the cutting segment steps have a height of 10% to 50% of a width of the cutting segments.

12. The harvesting machine according to claim 1, wherein the cutting segment steps extend parallel to a travel direction of the harvesting machine.

13. The harvesting machine according to claim 1, wherein the conveying and guiding elements have ends formed as counter blades for interacting with the cutting segments.

14. The harvesting machine according to claim 13, wherein the conveying and guiding elements have a division, defined by a spacing of forward coupling points of two neighboring ones of the conveying and guiding elements on the at least one endless conveyor, and wherein for two divisions of neighboring ones of the conveying and guiding elements at least three of the ends formed as counter blades are provided.

\* \* \* \* \*